3,507,928
ISOMERIZATION OF 1,3-CYCLOOCTADIENE
Robert E. Rinehart, Rutherford, N.J., assignor to Uniroyal, Inc., New York, N.Y., a corporation of New Jersey
No Drawing. Application Oct. 3, 1963, Ser. No. 313,424, now Patent No. 3,433,808, which is a continuation-in-part of application Ser. No. 262,347, Mar. 4, 1963. Divided and this application Apr. 12, 1968, Ser. No. 763,434
Int. Cl. C07c 29/00
U.S. Cl. 260—666     1 Claim

ABSTRACT OF THE DISCLOSURE

This invention relates to a new method for isomerizing certain monomeric olefins cyclic compounds.

---

This is a division of application Ser. No. 313,424 filed Oct. 3, 1963 which is now Patent No. 3,433,808 issued Mar. 18, 1969, and which is a continuation-in-part of application Ser. No. 262,347 filed Mar. 4, 1963 now abandoned.

Isomerization of olefins often is conducted under conditions involving relatively high temperatures, as in the gas phase, or in the presence of large amounts of acids or bases [cf. Emmett, "Catalysis," vol. VI, Reinhold, New York (1958)]. Very often decomposition accompanies the isomerization resulting in lowered yields. These methods, which require large amounts of heat or catalyst, are inefficient.

The present invention provides a simple method for the isomerization of certain olefinic compounds to useful isomers under mild conditions of temperature and pressure.

The monomeric olefinic cyclic compound that may be isomerized by the process of the present invention is 1,3-cycloöctadiene, containing no vinyl group. According to the present invention, such a compound is isomerized by treatment with a rhodium salt.

In carrying out the present invention, either the monomeric olefinic cyclic compound to be isomerized is contacted with the rhodium salt directly as by dissolving the rhodium salt in the compound, or the isomerization may be carried out in a liquid medium as in water, or in an organic solvent such as ethanol, ethylene glycol, dimethylformamide, dimethyl sulfoxide, tetrahydrofuran, acetic acid. The time and temperature of treatment with the rhodium salt are not critical and generally will be from 1 hour to 10 days, at temperatures from 20° C. or below to 100° C., generally from 40° C. to 100° C. Higher temperatures can be used but offer no advantage and are often disadvantageous because the resultant increase in vapor pressure may require the use of pressure equipment.

The rhodium salts that may be used are the salts of conventional acids, such as rhodium chloride, bromide, iodide, sulfate, acetate, nitrate and the like. The amount of rhodium salt is not critical, and usually from 0.0001 to 10 mole percent based on the olefinic compound will be used.

The following example illustrates the invention.

EXAMPLE 1

This example shows the isomerization of 1,3-cycloöctadiene to 1,5-cycloöctadiene.

A mixture of 2 grams of rhodium chloride trihydrate, 1 ml. of 1,3-cyclooctadiene and 20 ml. of absolute ethanol was heated at 50° C. for 24 hours. During this time an orange-colored solid formed in the reaction mixture. Separation of the solid material and recrystallization from glacial acetic acid yielded 1.24 grams of pure rhodium chloride-1,5-cyclooctadiene complex, identical in melting point and in the infrared spectrum with the bis (cycloocta-1,5-diene) mu, mu'-dichlorodirhodium reported by Chatt et al., J. Chem. Soc. 4735 (1957).

The recrystallized orange complex was suspended in 20 ml. of 10% aqueous KCN, in which it dissolved rapidly, giving a colorless solution containing a small amount of insoluble hydrocarbon. The hydrocarbon was extracted into pentane. The organic layer was dried over anhydrous $CaCl_2$, filtered, and concentrated by evaporation. Analysis by vapor phase chromatography revealed only one principal peak (in addition to pentane) at the retention time observed for 1,5-cyclooctadiene. The data indicated that the 1,5-cyclooctadiene was of greater than 99 mole percent purity; no 1,3-isomer was detected. The 1,5-cyclooctadiene may also be recovered from the complex by similar treatment with other strong field ligands, such as other alkali-metal cyanides, alkali-metal thiocyanates, or organic phosphines, e.g. trialkyl phosphines, triphenyl phosphine.

Having thus described my invention, what I claim and desire to protect by Letters Patent is:

1. The method of isomerizing 1,3-cyclooctadiene to 1,5-cyclooctadiene which comprises: contacting a 1,3-cyclooctadiene which is free from vinyl groups with a rhodium salt selected from the group consisting of rhodium salt selected from the group consisting of rhdoium chloride, -bromide, -iodide, -sulfate, -acetate, or -nitrate, the amount of said rhodium salt used being 0.0001 to 10 mole-percent based on the cyclooctadiene, said isomerization being conducted by dissolving said rhodium salt in said 1,3-cyclooctadiene, or by placing said 1,3-cyclooctadiene and rhodium salt in water or an organic solvent selected from the group consisting of ethanol, ethylene glycol, dimethylformamide, dimethyl sulfoxide, tetrahydrofuran or acetic acid for a period of about 1 hour to about 10 days at a temperature between about 20° C. and 100° C., to form a rhodium salt 1,5-cyclooctadiene complex reaction product, and thereupon isolating said complex and then contacting said complex with a strong field ligand selected from the group consisting of alkali metal cyanides, alkali-metal thiocyanates, trialkyl phosphine and triphenyl phosphine to recover said 1,5-cyclooctadiene product.

References Cited

UNITED STATES PATENTS 3,305,593    2/1967    Rinehart.

OTHER REFERENCES

J. Chatt and L. M. Veuauzi, J. Chem. Soc., (London) 1957, pp. 4735–4741.

Robert E. Rinehart et al., J. Amer. Chem. Soc., 84, pp. 4145–4147, 1962.

Robert E. Rinehart and Jack S. Lasky, J. Amer. Chem. Soc., 86, pp. 2516–18, 1964.

DELBERT E. GANTZ, Primary Examiner

V. O'KEEFE, Assistant Examiner